(No Model.)

R. C. PAUL.
PULLEY.

No. 400,706.  Patented Apr. 2, 1889.

Witnesses.

Inventor.
R. C. Paul.

UNITED STATES PATENT OFFICE.

ROBERT C. PAUL, OF CUMBERLAND, MARYLAND.

PULLEY.

SPECIFICATION forming part of Letters Patent No. 400,706, dated April 2, 1889.

Application filed November 15, 1888. Serial No. 290,953. (No model.)

*To all whom it may concern:*

Be it known that I, ROBERT C. PAUL, of the city of Cumberland, in the county of Alleghany and State of Maryland, have invented certain new and useful Improvements in Pulleys, of which the following is a specification, reference being had to the accompanying drawings, forming a part thereof.

Figure 1:
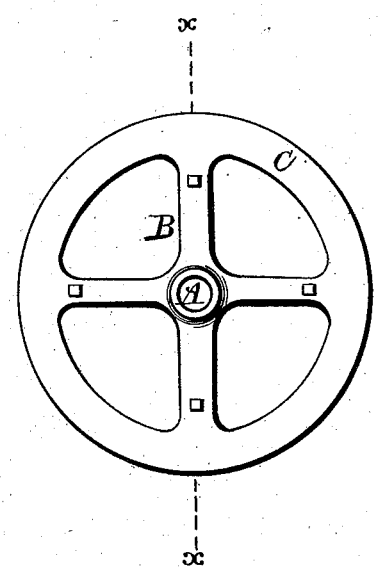
Figure 2:
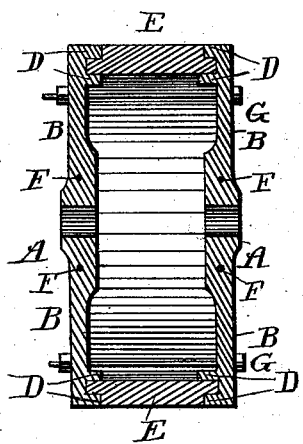

In the drawings, Figure 1 represents a side view of the pulley; Fig. 2, a vertical section on the line $x\ x$.

The object of my invention is to make a durable and inexpensive pulley, which may be either solid or split, having a face or periphery formed by the metallic heads and the wood staves, and the whole so formed that interchangeable wood staves or sections may be used, by which the face can be varied in width. This I accomplish by constructing a pulley of two cast-iron heads, Fig. 1, each the counterpart of the other, and each consisting of the hub A, arms B, and rim C. Upon the inner side of the rim C of each side, Fig. 2, are cast solid with the rim the double flanges D, which stand one-half inch or more apart and are parallel to each other. The face is formed by placing the heads in position with the flanges opposite, and fitting to the flanges the wood staves or sections E, the ends of which are tenoned. The breadth of the face or periphery may be varied by varying the length of the staves. The heads are drawn firmly to the face by the rods G, which pass from one to the other at convenient distances apart. When a split pulley is desired, the iron heads may each be cast in two equal sections, the dividing-line passing through the center of the hub and dividing the arms on the line $x\ x$. The face or periphery is then formed by placing the wood staves in position, as above described, the heads being drawn together by the rods G. The sections of the split pulley are then united by bolts at the holes F in the usual manner.

What I claim is—

A pulley consisting of two circular heads provided with inwardly-projecting flanges and with hub portions, a series of tenoned staves inserted in said flanges between the heads and forming with the annular portions of the heads the face or periphery of the pulley, and screw rods and nuts for securing the heads and staves in position, substantially as described.

ROBERT C. PAUL.

Witnesses:
M. G. MILLER,
JOS. A. GOUDER.